United States Patent
Galloway (10) Patent No.: US 9,314,012 B1
(45) Date of Patent: Apr. 19, 2016

(54) DECOY BAG

(71) Applicant: HARD CORE BRANDS INTERNATIONAL LLC, Ottawa, IL (US)

(72) Inventor: Michael James Galloway, Chardon, OH (US)

(73) Assignee: HARD CORE BRANDS INTERNATIONAL LLC, Ottawa, IL (US)

( * ) Notice: Subject to any disclaimer, the term of this patent is extended or adjusted under 35 U.S.C. 154(b) by 0 days.

(21) Appl. No.: 14/793,003

(22) Filed: Jul. 7, 2015

Related U.S. Application Data (60) Provisional application No. 62/021,760, filed on Jul. 8, 2014.

(51) Int. Cl.
*B63B 22/24* (2006.01)
*A01M 31/00* (2006.01)
*A01M 31/06* (2006.01)

(52) U.S. Cl.
CPC .............. *A01M 31/00* (2013.01); *A01M 31/06* (2013.01); *B63B 22/24* (2013.01)

(58) Field of Classification Search
CPC ................................ B63B 22/24; A01B 22/24
USPC ......................................................... 441/32
See application file for complete search history.

(56) References Cited

U.S. PATENT DOCUMENTS

| D393,364 S | * | 4/1998 | John | D3/221 |
|---|---|---|---|---|
| D470,910 S | * | 2/2003 | Abel | D22/199 |
| D627,161 S | * | 11/2010 | Tilby | D3/262 |
| 8,006,465 B1 | * | 8/2011 | Albert, III | A01M 31/06 53/413 |
| 8,146,763 B2 | * | 4/2012 | Turvey | B65D 11/186 220/6 |
| 2003/0218039 A1 | * | 11/2003 | Abel | A01M 31/006 224/656 |
| 2005/0271477 A1 | * | 12/2005 | Sehl | B63B 21/00 405/218 |
| 2006/0115186 A1 | * | 6/2006 | Anderson | A01M 31/06 383/33 |

* cited by examiner

*Primary Examiner* — Stephen Avila
(74) *Attorney, Agent, or Firm* — Rankin, Hill & Clark LLP (57) ABSTRACT

A decoy bag for decoys with Texas rig lines secured together by a ring that includes a panel structure extending between first and second ends and the first panel portion including a ring opening sized to allow passage of the ring but not allowing passage of the decoys such that the ring can be pulled through the ring opening and the decoys can be pulled against the first panel portion but not out the ring opening, the second panel portion including a selectively closable decoy opening positionable between opened and closed conditions wherein it is allow a plurality of decoys to pass therethrough simultaneously when opened and prevent the decoys from passing therethrough when closed, the panel structure further including a flotation device to allow at least a portion of the decoy bag to float on water.

25 Claims, 7 Drawing Sheets

DECOY BAG

This application claims priority in provisional patent application Ser. No. 62/021,760 that was filed on Jul. 8, 2014, which is incorporated by reference herein.

The invention of this application relates to hunting bags and, more particularly, to a hunting bag for carrying decoys.

BACKGROUND OF THE INVENTION

The invention of this application relates to hunting bags and, more particularly, to a hunting bag that allows decoys to be easily transported into the field, easily deployed in the field and easily re-bagged in the field.

Decoy bags have been around for many years and there are many types of decoy bags used in the industry. This application relates to a specific type of decoy bag that is used in connection with Texas Style decoy rigs; however, the invention of this application could be used for a wider range of decoys. Thus, while the bag is particular useful for Texas Style decoy rigs, it is not to be limited to the same.

A common problem with decoys is the time and effort involved in keeping the anchor lines and weights from becoming tangled while individually placing, retrieving and wrapping the line of each decoy. A Texas rigged duck decoys has solved many of these problem, but they present a problem for transporting the decoys into and out of the field.

The Texas rig concept originated on the Gulf Coast in view of its shallow waters and includes a short line, around three feet long, that is attachable to a decoy. In this respect, a first end of the line is configured to be attachable to a decoy (such as to the keel of a decoy) and the second end is configured to be attachable to a weight (or maintain a weight on the line) (See FIGS. 2-6). Yet further, the weight can be configured to slide along the line such that when the decoy is transported, the weight slides and rest near the decoy and when it is deployed, the weight moves away from the decoy to rest on the underlying surface below the decoy that is floating in the water. This sliding action improves the transportability of the decoy by moving the weighted portion of the carried load as low as possible.

Even yet further, the weight can be fixed on one end and the rig can include a decoy clip such that the decoy is configured to slide along the line so that decoy moves toward the weighted end of the line when the Texas rig decoy system is transported. Either way, the weight and the decoy are positionable on one end of the line and the other end of the line can be used to carry a plurality of decoys. This "other" end of multiple lines can be selectively secured together by an attachment loop or carabiner.

By allowing multiple lines to be connected together, it is easier to transport several decoys into and out of the field.

However, while there is a wide range of hunting bag designs used in the industry and many of these bags are well designed for certain uses in the field of hunting; however, there is no bag design that effectively works in relation to supporting Texas rig decoy rigs, transporting these decoys, storing these decoys and/or deploying these decoys wherein there is a need in the industry.

SUMMARY OF THE INVENTION

The invention of this application relates to hunting bags and, more particularly, to a hunting bag that can be used with Texas rig decoys. In particular, a decoy bag that can be used to store, transport and deploy Texas rig decoys.

More particularly, provided is a hunting bag that includes both a small top opening to manage the anchor lines and a large bottom opening to allow open access to the inside of the decoy bag.

According to one set of aspects of the invention of this application, the top opening of the hunting bag is shaped or configured to allow a mass of anchor lines to be passed through and the bottom opening of the bag is shaped or configured to allow the corresponding mass of decoys attached to the mass of anchor lines to easily enter into the bag.

According to other aspects of the invention of this application, provided is a cinch system to quickly and easily close (or partially close) the large bottom opening of the bag.

According to another aspect of the invention of this application, the bottom of the hunting bag can include at least one mesh panel to allow for water drainage when wet decoys are placed in the bag.

According to other aspects of the invention of this application, the at least one mesh panel surrounds the bottom opening of the bag.

According to even yet further aspects of the present invention, the panels of the bag together generally form an inverted cup shape.

According to further aspects of the invention of this application, the bag shape changes when it is cinched into the transport configuration. Yet further, the bag can be configured such that the bag generally forms to the shape of the decoys positioned within the bag such that the transport configuration or size of the bag depends on the number and/or size of the decoys within the bag.

According to other aspects of the invention of this application, provided is at least one side panel that is a protective panel to help keep the decoys therein clean and dry. Yet further, the at least one side panel can be a generally non-porous panel.

According to yet further aspects of the present invention, at least one of the side panels can be an elastic panel. The at least one elastic panel can be used to help the bag better conform to the size of the decoys therein, help create a tight fit for the decoys therein to reduce movement of the decoys relative to one another and/or reduce damage of the stored and/or transported decoys.

According to even yet further aspects of the invention of this application, the bag can include one or more floatation devices to prevent the bag from sinking in water. As is known, hunting (especially hunting waterfowl) is done around bodies of water wherein bags and/or supplies can be lost if they are accidentally dropped into the water. Further, bags can sink when deploying decoys in water wherein the hunter must reach into the water or use his foot to find and pull the bag from the water. As can be appreciated, while hunters wear water tight footwear (such as hip waders), their upper body is not so protected and it is preferred by hunters that there upper body stay dry when in the field. Accordingly, at least one embodiment of the invention of this application includes one or more flotation devices secured thereto to prevent the bag from sinking if dropped or placed in the water.

According to another aspect of the invention of this application, the floatation device can include one or more flotation devices that are positioned near the top opening of the bag. Accordingly at least one embodiment of the invention of this application, the floatation device can include a foam ring surrounding the top opening.

According to further aspects of the invention of this application, the hunting bag can include a protective and/or reinforcing grommet for the top opening. This grommet can strengthen the top opening, maintain a desired shape of the top opening, maintain the top opening in an opened condition for ease of use and/or protect the anchor lines moved through the top opening. Accordingly at least one embodiment of the invention of this application, the top opening grommet can be large enough to allow the transport loop used to secure multiple anchor lines together to be passed therethrough.

According to even yet further aspects of the invention of this application, the hunting bag can include one or more (detachable or fixed) bags, compartments, pouches and/or other storage features to store and/or transport other items associated with hunting and/or the decoys stored within the bag.

These and other aspects, objects, features and advantages of the invention will become more apparent to those skilled in the art upon the reading of the description of the invention set forth below taken together with the drawings and pictures which will be described in the next section.

BRIEF DESCRIPTION OF THE DRAWINGS

The invention may take physical form in certain parts and arrangements of parts, a preferred embodiment or embodiments which will be described in detail and illustrated in the accompany drawings and attachments which form a part hereof and wherein.

DESCRIPTION OF PREFERRED EMBODIMENTS

Figure 2:
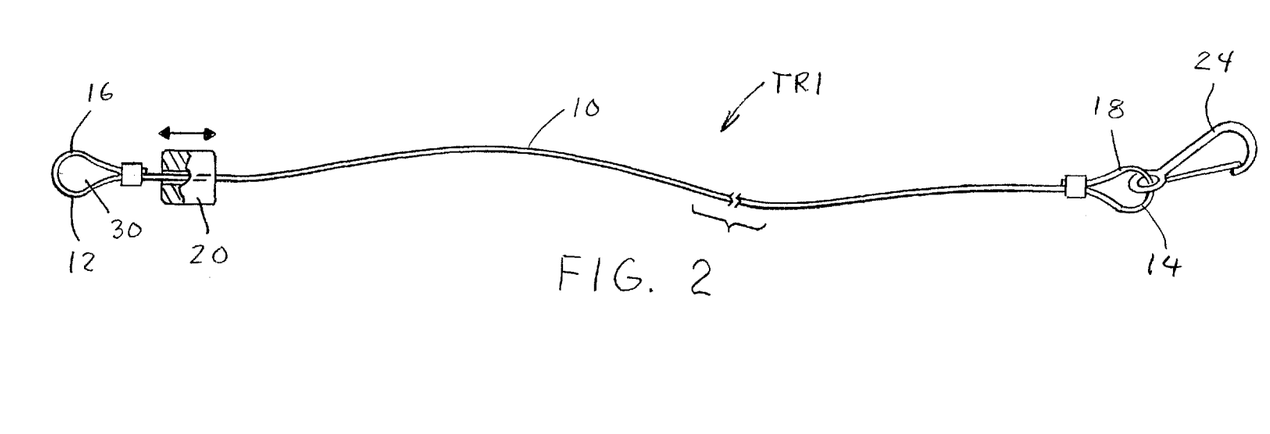
FIG. 2 is a schematic view of a first style of Texas rig line.
Figure 3:
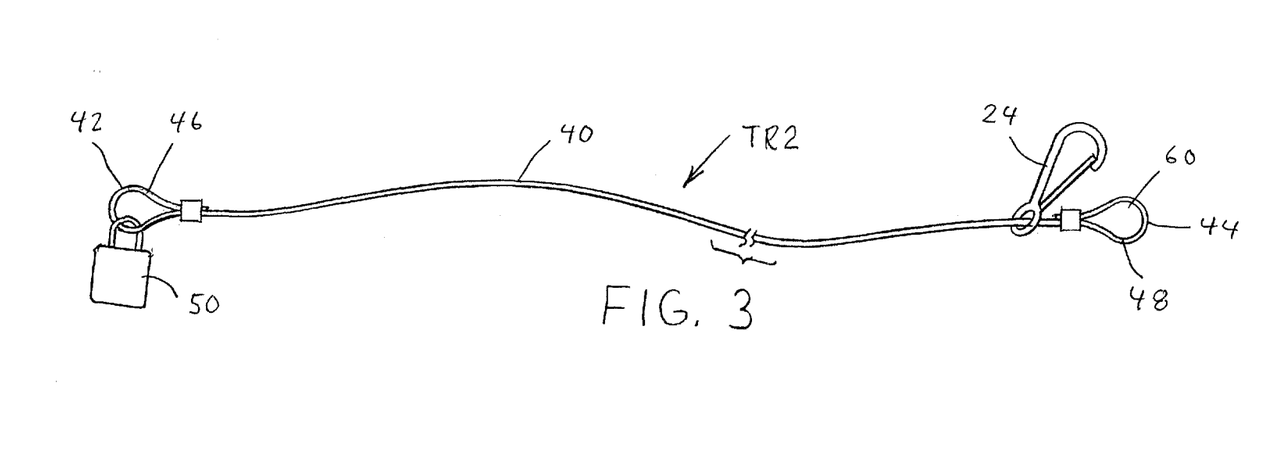
FIG. 3 is a schematic view of a second style of Texas rig line.

With reference to FIGS. 2 and 3, shown are two versions of a Texas rig decoy anchor line. FIG. 2 shows a first Texas rig configuration TR1 that includes a line 10 that extends between a first end 12 and a second end 14. Each of these ends can include loops 16 and 18, respectively. In this particular configuration, the line includes a weight 20 that is configured to slide along line 10 between ends 12 and 14. Configuration TR1 further includes a decoy clip 24 configured to secure a decoy relative to the line and which will be discussed more below. In this particular example, loop 16 can also be a support loop 30. In operation, when a decoy is secured to configuration TR1 by clip 24, weight 20 will slide toward end 12 when the decoy is deployed in water. Then, when the decoy is transported by transport loop 30, the weight will slide along line 10 and position itself near end 14 and the attached decoy.

FIG. 3 shows a second Texas rig configuration TR2 that includes a line 40 that extends between a first end 42 and a second end 44. Each of these ends can include loops 46 and 48, respectively. In this particular configuration, the line includes a weight 50 that is configured to be secured to one of the loops. As is shown, weight 50 is secured to loop 46. Configuration TR2 further includes a decoy clip 24 configured to attach to line 40 such that the clip slides along line 40 between ends 42 and 44. In this particular example, loop 48 can also be a transport loop 60. In operation, when a decoy (not shown in this figure) is secured to line 40 by clip 24, clip 24 will slide toward end 44 when the decoy is deployed in water. Then, when the decoy is transported by transport loop 60, the decoy will slide along line 40 and position itself near end 42 and the attached weight.

Figure 4:
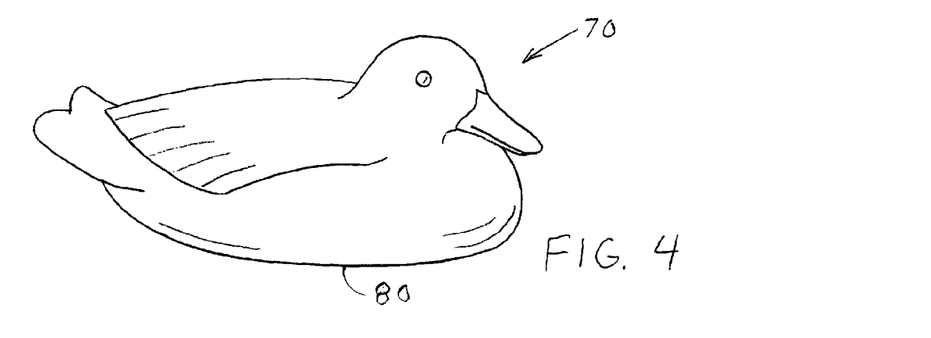
FIG. 4 is a perspective view of a waterfowl decoy.
Figure 5:
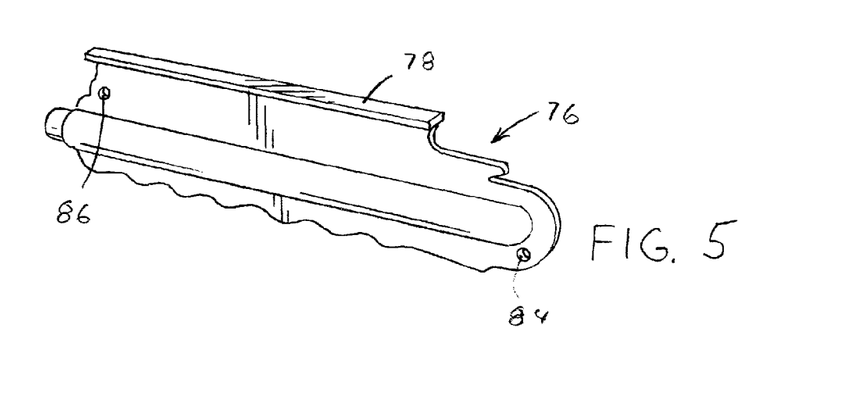
FIG. 5 is a perspective view of a keel for use on a waterfowl decoy.
Figure 6:
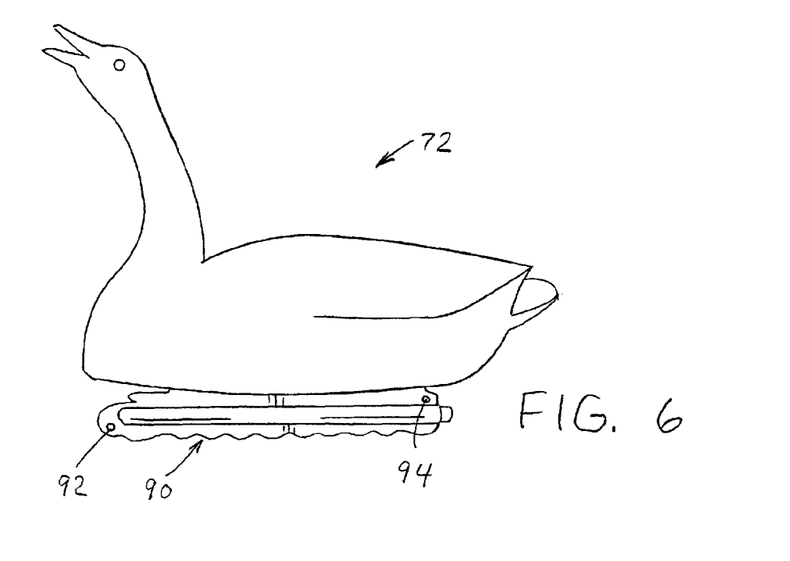
FIG. 6 is an elevational view of another waterfowl decoy that includes a keel.
Figure 7:
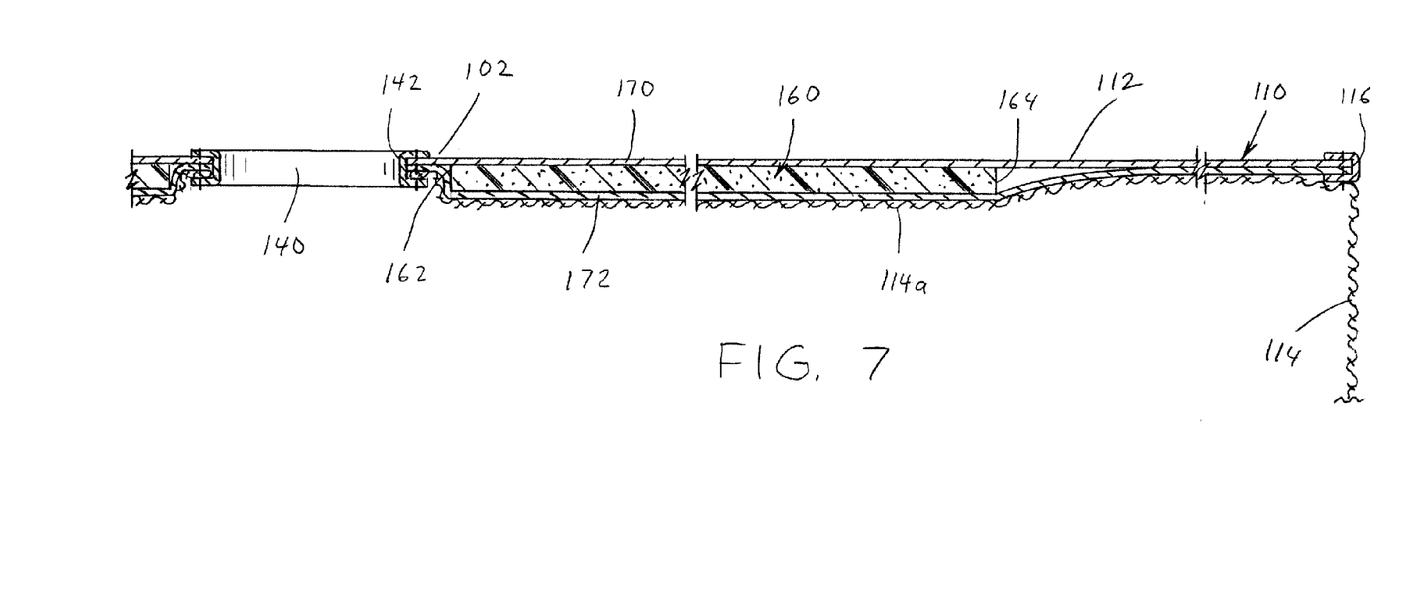
FIG. 7 is a sectional view taken along lines 7-7 in FIG. 10.

With reference to FIGS. 4-6, shown are examples of decoys 70 and 72; however, while two particular species are shown, the invention of this application can work in connection with any species and/or any species in any position. Further, the invention of this application and Texas rigs can be use with a wide range of types of decoys. As is shown, decoy 70 includes a keel 76 having a key 78 wherein keel 76 can be selectively attachable to a keyway (not shown) in a bottom 80 of decoy 70. Keel 76 can further include one or more openings to secure the key and decoy to a line, such as a Texas rig line. In particular, key 76 can include a front hole 84 and a rear hole 86.

Similarly, FIG. 6 shows decoy 72 that also includes a keel 90. As with the decoy above, key 90 can be a selectively attachable keel, but can also include a permanently attached keel. Yet further, the invention of this application can be used with decoys that do not include a keel. For the decoy shown, keel 90 includes a front keel hole 92 and a rear hole 94.

In the interest of brevity, further details on the decoys themselves along with the Texas rigs are not being provided in that these are known in the field by those skilled in the art.

Referring to FIGS. 1, 7-10, shown is a decoy bag 100 according to certain aspects of the invention of this application. Decoy bag 100 extends from a top extent 102 to a bottom extent 104. Bag 100 further includes a panel structure 110 that can extend between top 102 and bottom 104. However, it must be noted that the reference to top, bottom and/or other directional words in this application are merely intended to provide reference to the images in the figures wherein the use of these words are not intended to limit the invention of this application. As will be discussed more below, panel structure 110 can be formed by several separate panels joined to one another, can be made different types of materials, can includes a wide range of straps and/or support, and can be formed from any material known in the art. Further, panel structure 110 can be made from a wide range of materials known in the art and can have a wide range of outer prints. These can include, but are not limited to, hunting orange, black, tan, beige, green and camo print. Panel structure 110 can be made from porous and/or non-porous materials to help protect the decoys when they are stored and/or transported therein.

In the embodiment shown, panel structure 110 includes an upper panel portion 112 that extends downwardly from top 102 and a lower panel portion 114 that extends upwardly from bottom 104. The Panel portions can be separate panel(s) joined to one another by a seam 116 and/or any other joining method known in the art. Yet further, according to one set of embodiments, the panel(s) could include one or more elastic panels and/or shaping panels that can help the bag to mold to decoys D positioned therein to a desired shape and/or maintain the bag in a desired shape for loading, deploying and/or transporting the bag and decoys some of which will be discussed more below. Further, the bag can include more than two panel portions without detracting from the invention of this application. Yet even further the panel portions 112 and/or 114 can include use of elastic materials that can at least partially form the "elastic" panels noted above. The panels further include pleated sections to allow for expansion and contractions of the particular panel thereby forming an "elastic" panel structure.

Panel(s) 112 and 114 can collectively form a generally inverted cup shaped panel configuration for panel structure 110 that is a downwardly open cup shape extending downwardly from top 102 to a bottom edge 118 of bottom 104, which will be discussed more below.

Figure 8:
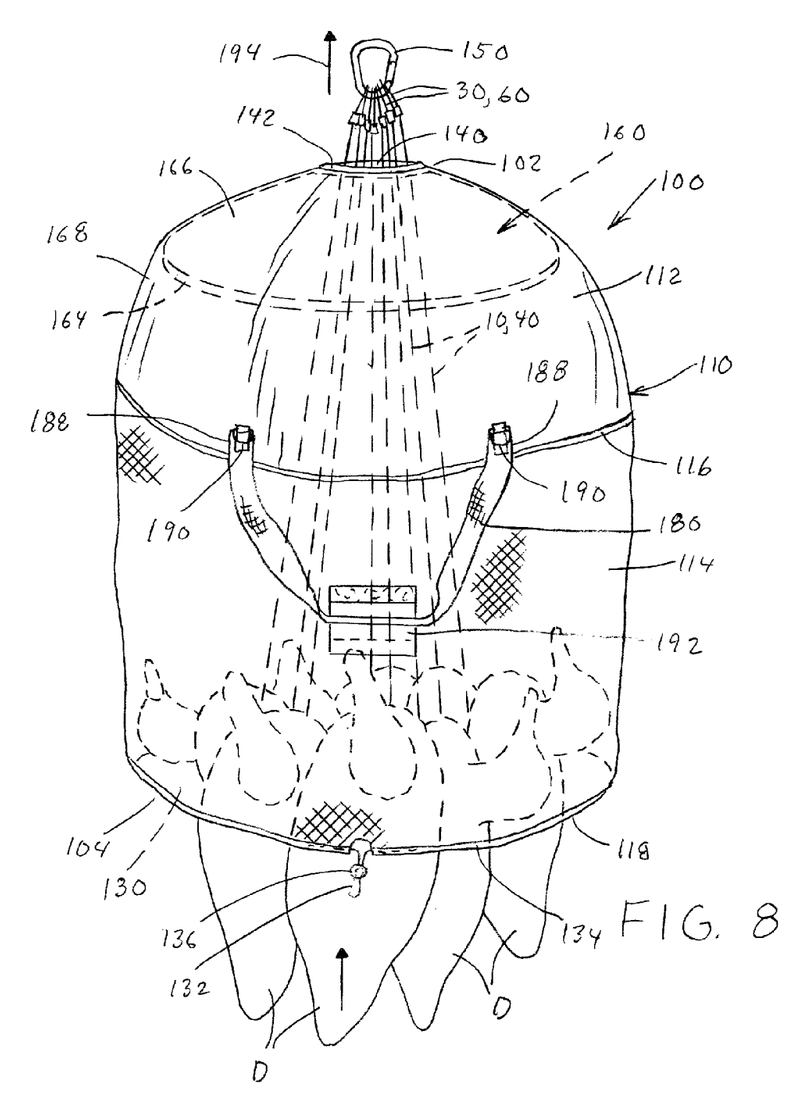
FIG. 8 is a perspective view of the decoy bag shown in FIG. 1 showing the decoy bag being loaded with a plurality of Texas rigged decoys wherein the bag is shown in an open condition.
Figure 9:
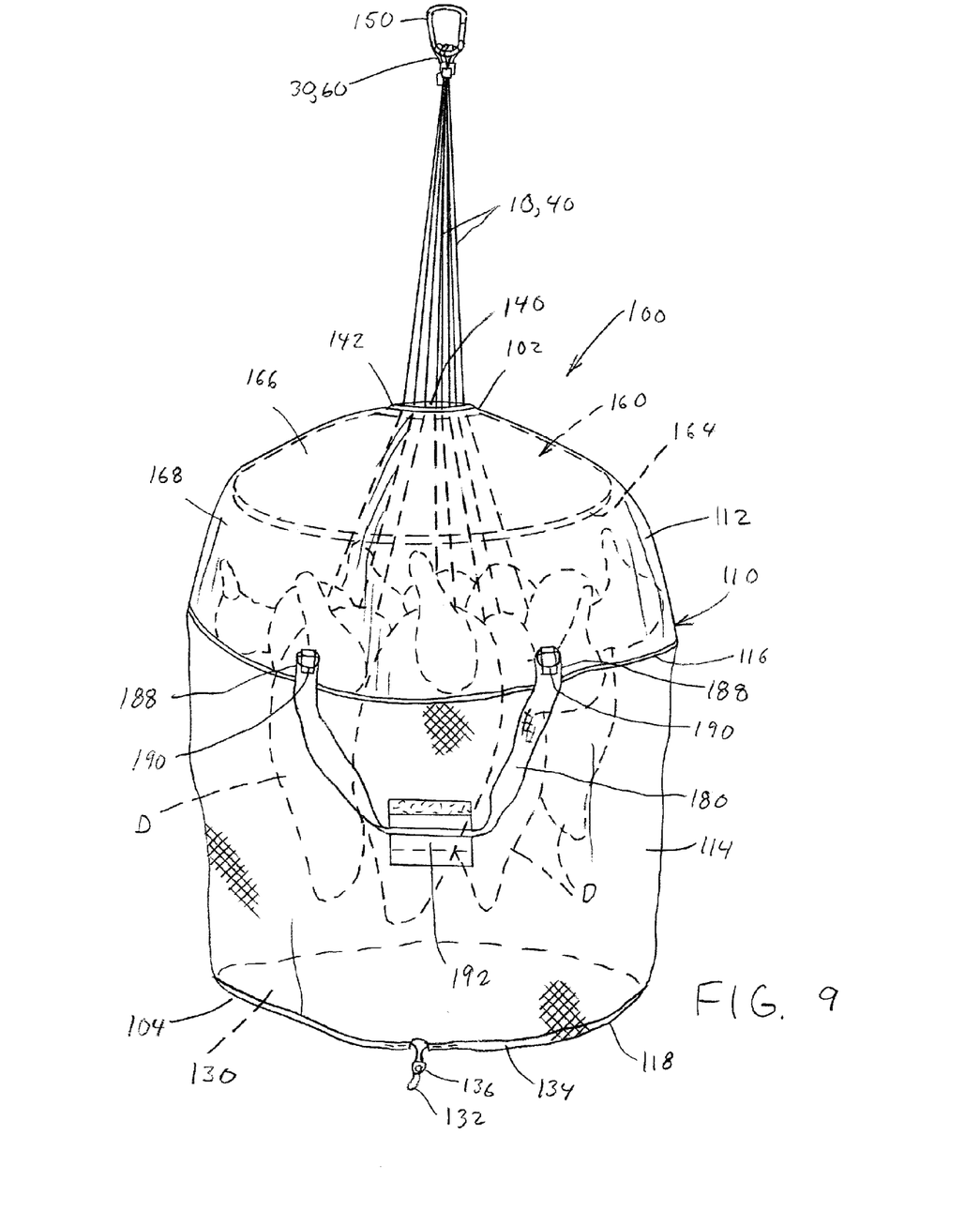
FIG. 9 is a perspective view of the decoy bag shown in FIG. 8 showing the decoys being pulled further into the decoy bag and the bag is shown in an open condition; and, FIG. 10 is a top perspective view of the decoy bag shown in FIG. 1 and is shown without decoys therein.
Figure 10:
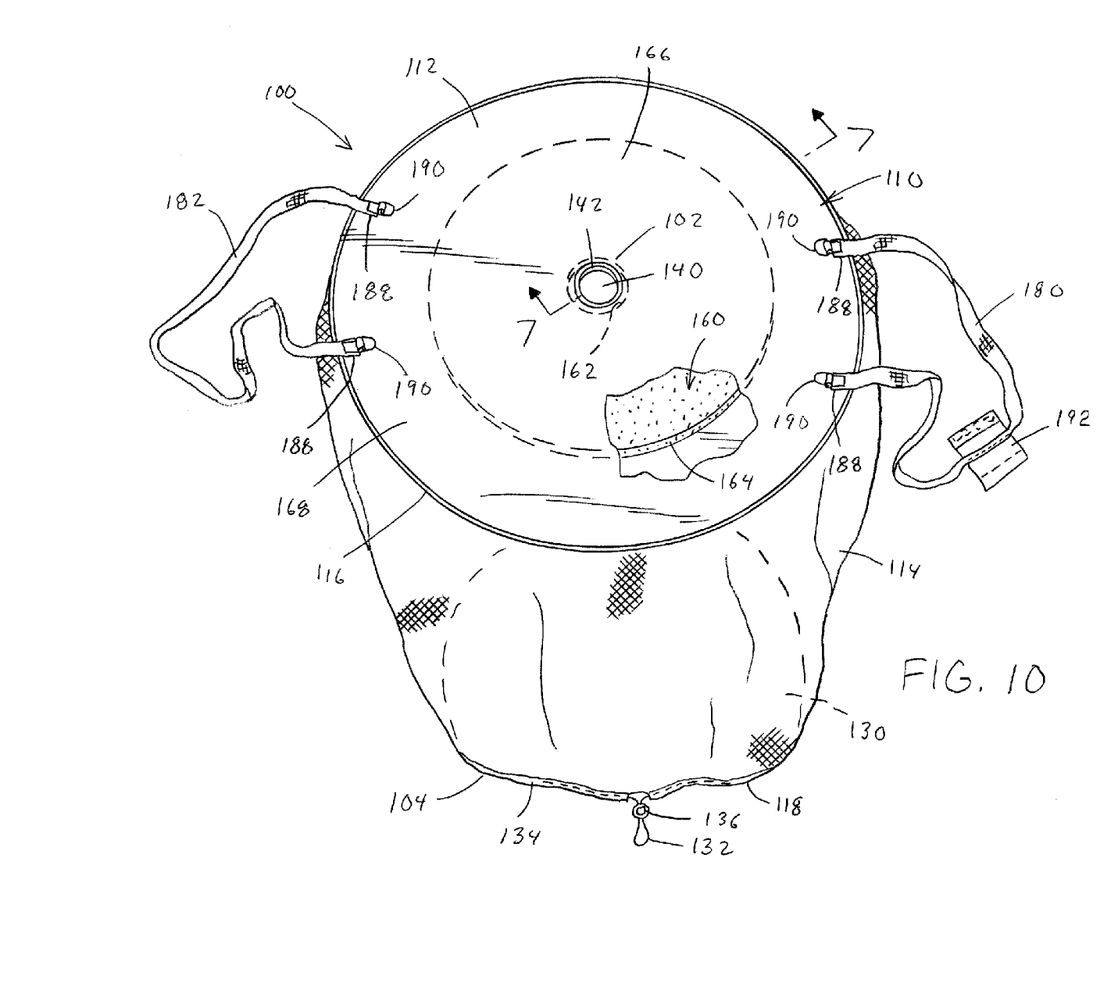

Bottom panel structure 114 can extend from bottom edge 118 to seam 116. Again, bottom panel 114 can be a single panel, formed by multiple panels and/or formed in combination with upper panel structure 112. In the embodiment shown, bottom panel is a single generally tubular shaped panel that is best shown in FIGS. 8 & 9. Bottom panel structure 114 extends downwardly from seam 116 wherein bottom edge 118 generally defines a bottom decoy opening 130 in the decoy bag. As with the other panels, bottom panel structure 114 can be formed from elastic material thereby further allowing the bag to conform to decoys therein. As is shown, bottom panel structure 114 is a single tubular panel portion formed by one or more mesh panels to allow water from wet decoys to effectively drain from bag 100. As can be appreciated, if decoys are stored wet and not allowed to dry, they can mold wherein including a mesh bottom panel arrangement can allow the decoys to quickly dry by allowing excess water to drain out of the bottom of the bag and to allow air circulation within the bag during storage.

Figure 1:
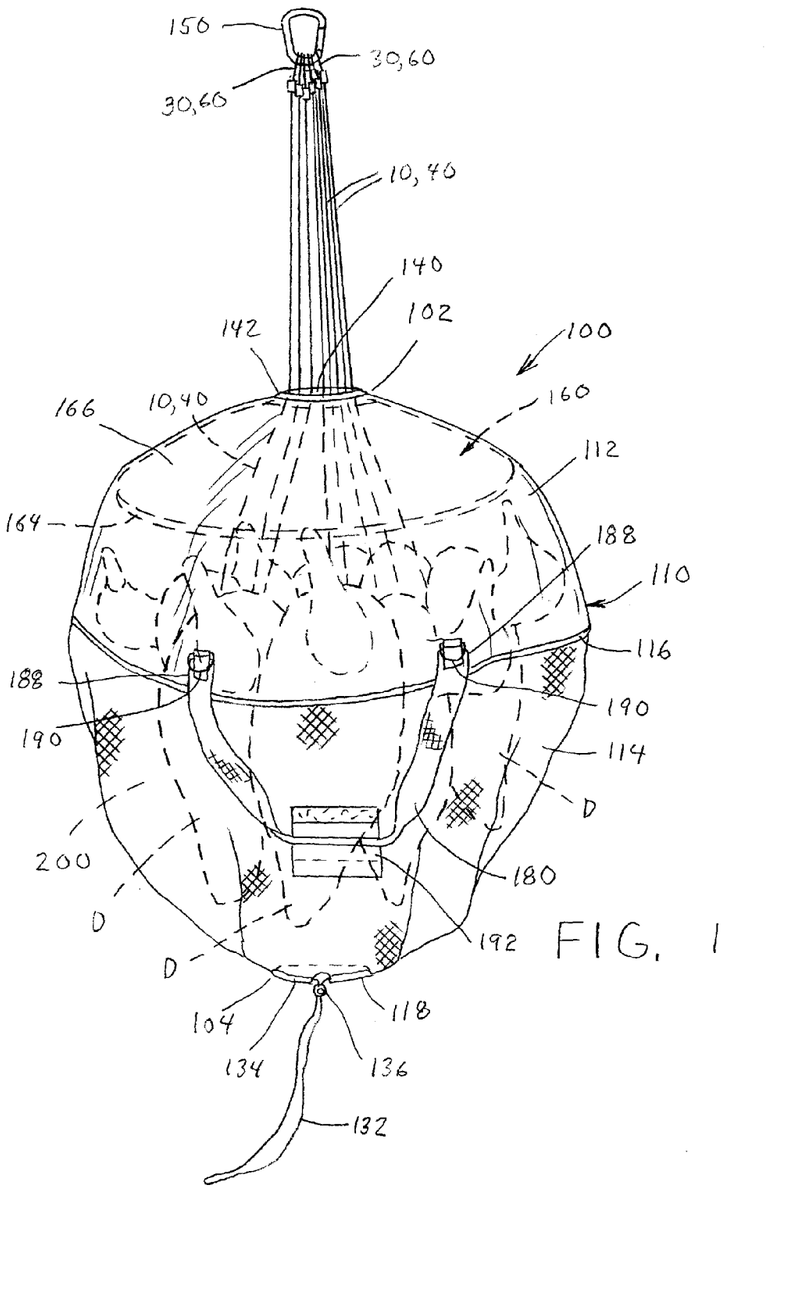
FIG. 1 is a perspective view of a decoy bag according to certain aspects of the invention of this application wherein the bag is shown in a transport configuration and closed condition.

Bottom panel structure 114 can further include a closing feature to help secure the decoys within the bag for transportation, which is best shown in FIG. 1. More particularly, bottom opening 130 can be a selectively closeable decoy opening by including a closing feature, such as a cinch line 132 within a cinch line channel 134. Cinch line 132 can further include a cinch lock 136 that can be any line lock known in the industry. The closing feature can include, but is not limited to, a push button cord lock, a tie lock, a clasp lock, a belt style lock, snaps, buttons, zippers, VELCRO®, straps, cords, and/or the like.

As is shown in the figures, cinch 132 allows opening 130 to open very wide to allow the decoys to be placed into the bag (see FIG. 8), but can substantially close off bottom opening 130 to maintain the decoys within the bag as is best shown in FIG. 1. Thus, the bag can be put into an opened or un-cinched condition (FIGS. 8 & 9) wherein opening 130 is fully open or into a closed or cinched condition (FIG. 1) wherein opening is fully, or at least substantially, closed off.

Top panel section 112, in the embodiments shown, extends upwardly from seam 116 toward top 102 and includes a top opening 140 that can be an opening in the top panel. Top opening 140 can include a grommet 142 that is sized and configured to allow passage of a carabiner or holding loop 150 therethrough. Grommet 142 can be a wide range of grommets including rigid grommets, such as a plastic grommet, or softer flexible grommets such as a fabric seam extending around the opening to generally just define and reinforce the top opening.

In a preferred set of embodiments, decoy bag 100 further includes one or more flotation devices 160 to help float the bag, preferably upright, when it is used in water. Floatation device 160 can be any floatation device that is buoyant to allow some or all of bag 100 to float during and/or after the deployment of the decoys, or during and/or after the retrieval of the decoys. In the embodiments shown, floatation device 160 is an annular ring shaped device having an inner edge 162 and an outer edge 164. Inner edge is generally coaxial with top opening 140 thereby extending about the top opening. Outer edge 162 extends away from opening 140 wherein it can face seam 116. Floatation device 160 can be a semi-rigid device that can help form a top panel section 166, as referenced above, that helps shape the bag into a cup shape during deployment of the decoys and/or the retrieval of the decoys wherein this embodiments includes a shaping panel structure as is referenced above. As is best shown in FIG. 8, flotation device 160 can help define a tubular bag shape extend downwardly from panel section 166 starting along panel portion 168 and which can extend into bottom panel structure 114. As can be seen in this figure (and others), this can greatly improve the loading of the decoys into the bag.

In the embodiments shown, flotation device is an annular ring that is a foam ring having a ring thickness. Top panel structure 112 can be formed by an outer panel portion 170 and an inner panel portion 172 wherein foam ring 160 can be sandwiched between the inner and outer panel portions. The ring can be fixed relative to these sections and/or can float within the sections. Any method known in the art could be used to secure the foam ring into top panel 112 including, but not limited to, stitching, adhesive, Velcro, pockets or the like. Yet even further, bottom panel 114 can extend into top panel 112 to further strengthen the overall bag and/or provide additional ventilation qualities for the overall bag. As is shown, bottom panel 114 includes a material portion 114a that extends underneath panel portion including inner panel portion 172.

Bag 100 can include one or more structures to help transport the bag in the field. As is shown, bag 100 can include handle straps 180 and 182 that can be joined to top panel 112. In the embodiments shown, straps 180 and 182 are U-shaped straps that are joined to top panel 112 at ends 188. At least one of straps 180 and 182 can include a strap handle 192 that can allow the straps to be selectively secured to one another. Yet further, straps 180 and 182 can include backpack style straps to allow the bag to be secured to the hunters back. Accordingly it is preferred, but not required, that panel(s) 112 be made from water proof material, or at least water resistant material to prevent and/or reduce the penetration of water through the material, all of which are generally referred to as non-porous. Yet further, in one set of embodiments, panels(s) 112 are made from material that does not absorb moisture and/or is quick to dry since the bag is used in the water right before it is used to carry the decoys out of the field. Yet even further, inner panel portion 172 can be made from a different material than outer panel portion 170 to allow one panel to be designed for contact with the decoys inside the bag and the other for contact with the user's back, if worn by the user when transporting the bag in the field. Yet even further, it has been found the foam ring can also be designed to provide extra comfort when the bag is carried wherein flotation device 160 can also act as a pad for transportation of the bag. Yet further bag 100 can include one or more attachment devices, such as D-rings 190. As is shown, bag 100 includes four D-rings that are positioned on ends 188. These D-rings can be used to allow for other transport straps, connection of hunting devices to the bag, or any other use.

With reference to FIGS. 8 and 9, when bag is in the open condition, decoys D can be easily loaded into bag 100. In this respect, and with special reference to FIG. 8, opening 130 can be a large opening, which can be as large as the overall general cylindrical shape of the bag. This large opening easily allows a large number of Texas rigs TR and decoys D to easily pass therethrough. As is noted above, decoy bag 100 can include a cup shape that extends towards opening 130. This cup shape can have a cross-sectional area near opening 130. And, the bag can have a cross-sectional area at opening 130. When in the open condition, the opening cross-section area can be generally equal to the cross-sectional area near the opening and/or of the cup shape. This allows for the free passage of the decoys into the bag with little or no resistance. FIG. 9 shows the decoys being pulled into the bag toward top opening 140 and upper panel structure 112.

Then, the opening is cinched to maintain the decoys within the bag. In that the bag is preferably generally cylindrical in configuration, the cup shape is generally cylindrical or conical; the cup shape can have a diameter at one or more positions between the upper and lower ends. Opening 130 can be generally circular and can have a diameter that is generally equal to the diameter of the cup shape near the bottom end. Again, this creates a low resistance loading of the decoys into the bag.

In greater detail, once Texas rig TR and decoys D are connected to holding loop 150, holding loop 150 is then directed through bottom opening 130 and then top opening 140 oriented as is shown in FIG. 8 such that ring 150 is in the lead and line 10, 40 along with decoys D trailing behind. As ring 150 is directed through opening 140 (see arrow 194), it is pulled from the bag wherein decoys D and lines 10, 40 are then pulled into opening 130 (or the bag is positioned about the decoys). In that decoys D are much larger than top opening 140, ring 150 can be pulled tight to move the decoys upwardly toward top panel 112 as is shown in FIG. 9. In that opening 130 is a large opening, a plurality of decoys can be quickly and easily moved through opening 130 simultaneously without significant resistance beyond the hunter merely orienting and aligning the decoys and the opening, but they cannot move through opening 140.

Once the decoys are in the desired position, opening 130 can be closed as is shown in FIG. 1. Again, cinch 132 can be used to close off bottom opening as is shown in FIG. 1 and discussed above. Once bottom opening 130 is closed, decoys D are secured in a bag compartment 200. Further, any remaining moisture on decoys D can drip out of compartment 200 and/or opening 130 as the decoys are carried out of the field.

As is shown, decoy bag 100 generally maintains its cup shape, but this cup shape can be smaller and take on the form of the decoys in compartment 200 when cinched. Further, depending on the size of opening 130 and the number of decoys within compartment 200, the shape of bag 100 can change shape substantial. As a result, when bag 100 is stored with decoys in compartment 200, the overall size of the stored bag is generally only as big as the decoys stored within.

As discussed above, panel portions 112 and/or 114 can include elastic materials, including an elastic mesh material, wherein bag 100 can be configured to change shape more significantly. As is also discussed more above, the bag can further include one or more shaping devices, such as floatation device 160, to maintain a desired bag shape for loading the bag. Thus, bag 100 can be configured, either with or without elastics, to substantially change shape and form around the decoys to reduce damage to the outer surface of the decoys by better holding the decoys relative to one another when the decoys are transported and/or stored. According to yet other embodiments (not shown), the bag could further include one or more shape changing adjustable straps or panels that can be used like cinch strap 132 to tighten compartment 200 after the decoys are positioned therein, but allow it to open wide for loading.

As a result of the bag design of this application, decoys that are deployed using Texas rig technology can be easily transported, and can be easily and quickly stored and re-deployed. Yet further, these can be done without tangling the Texas rig lines used to anchor the decoys in water.

While considerable emphasis has been placed on the preferred embodiments of the invention illustrated and described herein, it will be appreciated that other embodiments and equivalences thereof, can be made and that many changes can be made in the preferred embodiment without departing from the principals of the invention. Furthermore, the embodiment described above can be combined to form yet other embodiments of the intention of this application. Accordingly, it is to be distinctly understood that the foregoing descriptive matter is to be interpreted merely as illustrative of the invention and not as a limitation.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed.

It is claimed:

1. A decoy bag for holding a plurality of decoys that include Texas rig lines and wherein the Texas rig lines are joined by a line ring, the decoy bag comprising a panel structure extending between a first end and a second end, the panel structure including a plurality of panels portions including a first panel portion extending from the first end toward the second end and a second panel portion extending from the second end toward the first end, the first and second panel portions being fixed relative to one another between the first and second ends, the first panel portion including a ring opening sized to allow passage of an associated Texas rig line ring and not allowing passage of an associate decoy such that the associate rig ring can be pulled through the ring opening and the decoys can be pulled against the first panel portion but not out the ring opening, the second panel portion including a selectively closable decoy opening that can be positioned between an open condition and a closed condition, the selectively closable decoy opening being sized to allow a plurality of the associated decoys to pass therethrough simultaneously when in the opened condition and to prevent the associated decoys from passing therethrough when in the closed condition, the panel structure further including a flotation device to allow at least a portion of the decoy bag to float on water.

2. The decoy bag of claim 1, wherein the flotation device is fixed to the first panel portion.

3. The decoy bag of claim 2, wherein the flotation device surrounds the ring opening.

4. The decoy bag of claim 3, wherein the flotation device is an annular foam ring having an inner edge and an outer edge, the inner edge being coaxial with the ring opening.

5. The decoy bag of claim 4, wherein the first panel portion is formed from at least one non-porous panel and the second panel portion is a separate panel joined relative to the first panel and is formed from at least one mesh panel.

6. The decoy bag of claim 1, wherein the first panel portion is formed from at least one non-porous panel and the second panel portion is a separate panel joined relative to the first panel and includes water openings.

7. The decoy bag of claim 6, wherein the water openings are formed from at least one mesh panel.

8. The decoy bag of claim 7, wherein the at least one mesh panel substantially forms the second panel portion.

9. The decoy bag of claim 1, wherein the panel structure extending from the first end toward the second has a cup shaped panel configuration facing the closable decoy opening of the second panel portion.

10. The decoy bag of claim 9, wherein the cup shaped panel configuration has its open end at the closable decoy opening and has a cross-sectional area near the closable decoy opening, the closable decoy opening having an opening area when in the open condition that is generally equal to the cross-sectional area of the cup shape.

11. The decoy bag of claim 9, wherein the cup shaped panel configuration is generally cylindrical at least in the second panel portion and having a cup diameter, the closable decoy opening and has an opening diameter when in the opened condition, the opening diameter being generally equal to the cup diameter.

12. The decoy bag of claim 1, wherein the second panel portion includes a separate mesh panel that is generally cylindrical and extends between a first generally circular edge to a second generally circular edge, the first generally circular edge being joined to first panel portion and the second generally circular edge forming the selectively closable decoy opening.

13. The decoy bag of claim 12, wherein the first panel portion includes a separate non-porous panel that is cup-shaped having a transvers portion extending about the ring opening and a side portion extending from the transvers portion toward a side edge, the side edge being joined to the first generally circular edge of the separate mesh panel.

14. The decoy bag of claim 13, wherein the flotation device at least partially forms the transvers portion.

15. The decoy bag of claim 14, wherein the flotation device is an annular foam ring having an inner edge and an outer edge, the inner edge being coaxial with the ring opening and the outer edge generally separating the transvers portion from the side portion of the first panel.

16. The decoy bag of claim 14, wherein the wherein the second panel portion is generally cylindrical and extends between a first generally circular edge to a second generally circular edge, the first generally circular edge being joined to first panel portion and the second generally circular edge forming the selectively closable decoy opening, the selectively closable decoy opening including a cinch line having a cinch lock to maintain the selectively closable decoy in the closed condition.

17. The decoy bag of claim 1, wherein the ring opening is generally centered in the first panel portion, the ring opening including a grommet sized and configured to allow passage of the associated Texas rig line ring, the flotation device at least partially surround the ring opening.

18. The decoy bag of claim 17, wherein the flotation device is an annular foam ring having an inner edge and an outer edge, the inner edge being coaxial with the grommet.

19. The decoy bag of claim 18, wherein the grommet is a flexible grommet.

20. The decoy bag of claim 19, wherein the first panel portion includes a separate non-porous panel that is cup-shaped having a transvers portion extending about the grommet and a side portion extending from the transvers portion toward a side edge, the side edge being joined to the second panel portion, the flotation device at least partially forms the transvers portion.

21. The decoy bag of claim 1, wherein the first panel portion includes at least one non-porous panels and the second panel portion includes at least one panel portion that includes water openings.

22. The decoy bag of claim 21, wherein the water openings are formed from at least one mesh panel.

23. The decoy bag of claim 22, wherein the at least one mesh panel surrounds the selectively closable decoy opening.

24. The decoy bag of claim 22, further including at least one carrying strap positioned on the at least one non-porous panel.

25. The decoy bag of claim 24, wherein the at least one carrying strap includes a pair of U-shaped handle straps that selectively joinable to one another by a handle portion.

\* \* \* \* \*